May 13, 1958   F. A. ANGONA   2,834,422
SEISMIC DATA PRODUCING SYSTEM
Filed June 21, 1956   2 Sheets-Sheet 1
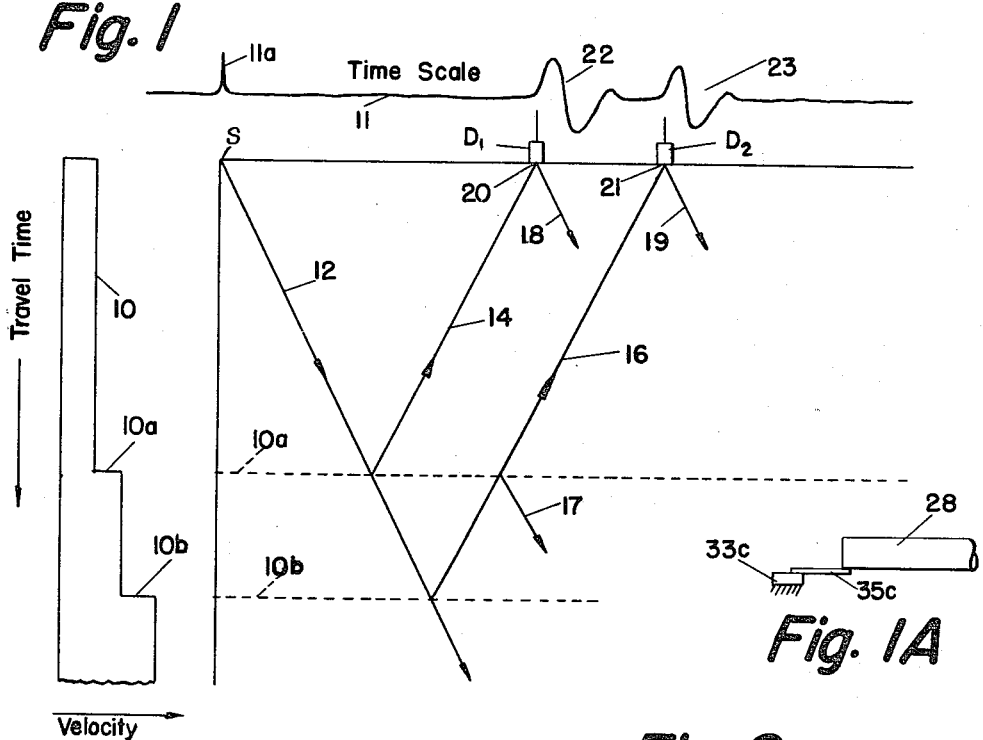
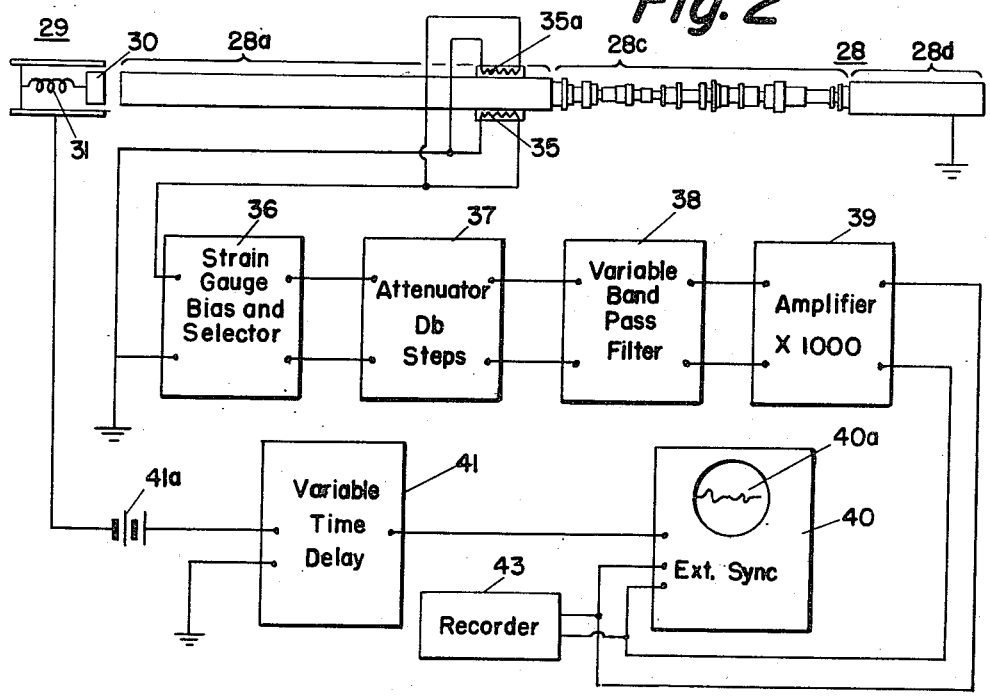

May 13, 1958 F. A. ANGONA 2,834,422
SEISMIC DATA PRODUCING SYSTEM
Filed June 21, 1956 2 Sheets-Sheet 2

United States Patent Office 2,834,422
Patented May 13, 1958

2,834,422

SEISMIC DATA PRODUCING SYSTEM

Frank A. Angona, Dallas, Tex., assignor, by mesne assignments, to Socony Mobil Oil Company, Inc., New York, N. Y., a corporation of New York Application June 21, 1956, Serial No. 592,960

16 Claims. (Cl. 181—.5)

This invention relates to methods of and means for obtaining seismic data from a seismic generator representative of known velocity contrasts existing below the earth's surface.

Seismic surveying for many years has represented one of the most useful tools in determining the location and character of reflecting beds and of the lithology of the earth. Nevertheless, seismograms present difficulties in their interpretation and frequently fail in the representation of reflecting interfaces and at other times are of an oscillatory character which appears to represent reflecting interfaces where in fact they do not exist. Because of the difficulties in interpreting the seismogram, additional information is needed in order to produce records by means of which greater and more reliable information may be had from the seismograms as to the subsurface character of the earth.

In accordance with the present invention, there is provided an elongated elastic medium whose cross-sectional area changes lengthwise thereof in scaled correspondence with velocity changes throughout a selected depth of the earth. The location and extent of each change in the cross-sectional area corresponds with the location and degree of velocity contrast at each reflecting interface. Accordingly, when a pulse of acoustic energy is applied to the elastic medium, it will travel lengthwise thereof and at each change of cross-sectional area a part of the acoustic energy will be reflected and a part of it will continue its travel along the length of the medium. There are coupled to the elastic medium, means responsive to vibrations for visually displaying the vibrations which then correspond with the seismogram and which include the multiple reflections between the various velocity contrasts. Thus, as some of the energy of the acoustic pulses is reflected from an interface, it will be understood when it strikes a second interface part of the reflected energy will be transmitted and part reflected. These occurrences with each change in cross section build up into a multiplicity of internal reflections and, of course, materially affect the resultant record which is displayed or recorded.

In avoidance of flexural stresses and strains which may appear in the elastic medium in the form of a rod, it has been found that two detecting means, such for example as two strain gauges, may be located at the same distance along the member and connected in parallel for cancellation of flexural waves.

For further objects and advantages of the invention and for various method aspects thereof, reference is to be had to the following description taken in conjunction with the accompanying drawings, in which:

Fig. 1 illustrates graphs explanatory of certain background theory for the present invention;

Fig. 1A is a fragmentary view of one end of a transmitting member;

Figure 3:
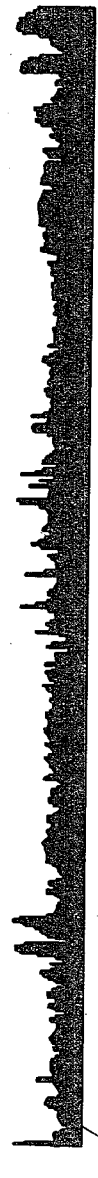
Figure 4:
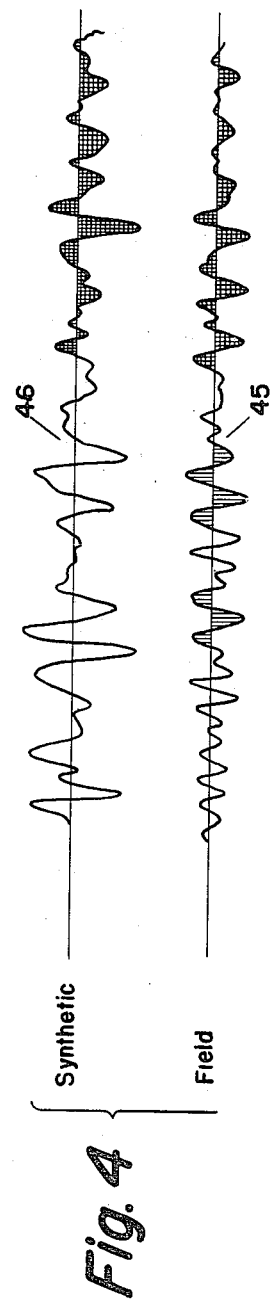
Figure 5:
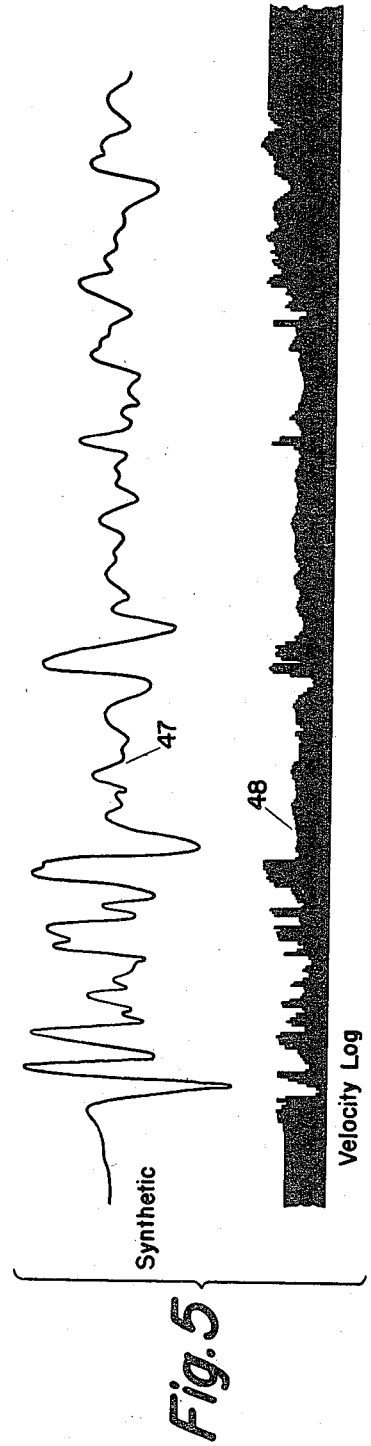

Fig. 2 diagrammatically illustrates one embodiment of the invention;

Fig. 3 is a reproduction of a velocity log;

Fig. 4 provides a comparison between a synthetic seismogram and a field seismogram; and Fig. 5 provides a comparison between a synthetic seismogram and a velocity log.

Referring now to Fig. 1, a graph 10 is representative of the varying velocity characteristics of subsurface strata. Thus, at the points 10a and 10b abrupt changes in velocity occur. In association with the graph 10, of velocity plotted against travel time, are additional explanatory diagrams. For example, a pulse 11a in a trace 11 is representative of a sudden release of acoustic energy at point S which travels downwardly as indicated by a ray 12. Upon arrival at the interface 10a, a part of the acoustic energy is reflected as indicated by the reflected ray path 14 and a part of the energy continues downwardly to the interface 10b, a part of the energy continuing downwardly and part being reflected along a ray path 16. The energy reflected from the interface 10b is partly reflected at the interface 10a as indicated by the arrow 17, and when the energy along the ray paths 14 and 16 strikes the earth's surface, a part of the energy is reflected back into the earth as indicated by the arrows 18 and 19. Detectors D1 and D2 located at the points 20 and 21 will respond to the earth movement produced by the seismic waves and will produce signals represented on the trace 11 as indicated at 22 and 23.

While Fig. 1 over-simplifies the problem as applied to the velocity contrasts encountered in subsurface strata, it is nevertheless useful in an understanding of the problems involved in producing an arrangement which will perform in the same manner as the earth and by means of which controlled performance may be obtianed in order to secure interpretative data for use in connection with seismograms taken in the field.

The purpose of a velocity log of a well bore is the production of a chart showing the changes in velocity along the length of the well. Instead of the simplified illustration of the graph 10 of Fig. 1, the velocity of acoustic energy in subsurface strata of the earth changes in a complex manner because the subsurface strata is in general multi-layered and without a predictable pattern. As the character of the subsurface beds changes either from hard to soft, or from soft to hard, or from sand to rock, etc., the velocity of acoustic energy in such formations can increase, decrease, and again increase with the order and number of changes dependent entirely on the character of the subsurface strata. Thus, as illustrated in the formation-velocity log of Fig. 3, each change in height from a base line 25 indicates a change in velocity. When it is considered that there will be reflection of energy each time there is a change in height from the base line 25, it will be seen that the internal reflections from the regions of velocity contrasts, generally referred to as multiples, will be large in number and may be substantial in magnitude. Accordingly, the earth movement as indicated by a detector or geophone may be greatly affected by the multiples which upon arrival at the geophone tend to obscure the wave forms indicative of the subsurface interfaces, the location of which is of primary interest to those who are seeking to learn more of the stratigraphy of the area under study.

In accordance with the present invention, Fig. 2, an elongated elastic member 28, such as a brass rod, has a changing diameter lengthwise thereof, each change in cross-sectional area corresponding with the change in the height of the velocity log as measured from the base line 25 of Fig. 3. Thus, Fig. 3 may be considered as a sectional elevation of one-half the rod with the length thereof scaled to the depth covered by the velocity log. In one embodiment of the invention, the highest velocity portion of the earth under study was of the order of 19,730 feet per second. In the apparatus constructed, this region was represented by a diameter of the elongated member of 0.3125 inch. The lowest velocity of earth of 7,190 feet per second was represented by a diameter of 0.188 inch.

The foregoing dimensions were adopted upon a consideration of the following factors. The graph 10, Fig. 1, may be considered as an idealized velocity log of the type taken in the field as by the continuous velocity well logging method. The resultant graph is one representative of acoustic velocity as a function of depth below the surface of the ground. There is then performed a continuous integration of velocity as appearing on the velocity log to produce a trace of total travel time versus depth. Such an integration may be carried out in any suitable manner, such for example, as by the apparatus disclosed in copending application Serial No. 322,718, filed by Robert A. Broding, and entitled "Measurement of Seismic Travel Time." The two graphs are then utilized to obtain a tabulation of values of velocity against travel time. The graph 10 of Fig. 1 corresponds with such a table of values. If there now be selected the largest of velocities or contrasts appearing in the table to be represented by the full cross-sectional area of the rod 28, the first step in the determination of desired scaling factor will have been made. With the cross-sectional area of the rod taken as representative of the highest velocity appearing in the graph 10, the aforesaid 19,730 feet per second, a lesser velocity of the aforesaid, 7,190 feet per second, will be represented by an area of the rod which is less than the full area of the rod by the same ratio as 7,190 bears to 19,730. In this manner, there are tabulated the desired areas for the rod for the multiplicity of values of velocities appearing on the graph. The elongated section 28c of the rod 28, Fig. 2, is then machined in accordance with the values thus determined. The machining of the rod will include a scaling factor for the desired length of section 28c.

In the foregoing embodiment a scaling factor of 554 was selected for the depth function though the particular scaling factors to be utilized can be varied as desired. Though the scaling factor of 554 is not at all critical and can be greatly decreased, it being understood that a decrease in the scaling factor may make the rod unduly long for convenient machining and the like, the scaling factor may be increased above 554. The requirement, however, is that the predominant wavelengths of the applied acoustic energy shall be large compared with the diameter (or area) of the rod. This requirement is necessary to assure that plane waves will be propagated lengthwise of the rod. If the scaling factor be too high, for example, of the order of 1,000 and above, the length of each part of the machine section 28c representative of the thickness of a bed having a particular velocity will be shortened to a point where resolution in terms of the response of the detector can only be achieved by the use of acoustic energy of relatively high frequency. Thus, if higher frequency acoustic energy be utilized, the desired ratio of wavelength to diameter of rod decreases, and there may not be achieved the propagation of plane waves along the length of the rod. With a scaling factor of 554 selected for travel time or the depth function equivalent to 0.26 inch of rod for each one millisecond of one-way travel time, the complete log was represented by a rod 8.2 feet in length. In a brass rod, acoustic or seismic waves have a velocity of around 12,000 feet per second. Attenuation of an applied acoustic pulse in the rod itself is negligible.

The rod 28, Fig. 2, suitably supported, has at one end a pulse generator 29 for producing an acoustic pulse. The generator is illustrated as including a weight 30 with an actuating means 31 for driving it at high speed against one end of the rod. In a preferred form of the invention, a gun is arranged to fire a metal bullet against the end of the rod to create a simple acoustic pulse for travel lengthwise of the rod. The bullet preferably has a diameter approximating that of the rod. A relatively long length 28a of the rod of uniform diameter is provided so that there will be substantially avoided the effect of reflections from the simulated earth's surface at the left-hand end of the rod. Such reflections from the earth-air boundary or interface are frequently referred to as "ghosts." Thus the interface to which the weight or bullet 30 is applied is far removed from the section 28c machined or otherwise of changing cross-sectional area corresponding with the velocity log of Fig. 3. The rod is also provided with a relatively long length at 28d of unchanging cross section which prevents obscuration of the rod by reflections from the right-hand end of the rod. The reflections from the ends of the rod are eliminated in the following manner. With the section 28a about 11 feet in length and with the section 28d about 4 feet in length, reflections from the extreme ends of the rod are not returned onto the machined or model-section 28c until after the completion of the seismic event through the region 28c.

There will now be described the means responsive to vibrations at selected points of the elastic member 28 for exhibiting or visually displaying vibrations resulting from the application of the acoustic pulse. As shown in Fig. 2, a strain gauge 35 is secured to the rod near the first change in cross-sectional area thereof encountered by the pulse from generator 29.

Strain gauges and their associated amplifying equipment are well known to those skilled in the art. Such equipment has been diagrammatically illustrated in a block diagram including a strain gauge bias and selector means 36 followed by an attenuator 37, a variable band-pass filter 38, and an amplifier 39 having a gain of about 1000. The output of the amplifier is applied to an oscilloscope 40. A variable time delay means 41 is utilized to initiate the operation of the oscilloscope 40 at any selected instant after the generation of the acoustic pulse. Thus, the time delay means which can be set from zero time to any desired delay is triggered, its operation initiated, automatically and in the following manner. Upon the firing of the gun 29, the bullet 30 upon contacting the end of the rod 28 completes an electrical circuit which may be traced from one side of a source of supply shown as a battery 41a to the time delay means 41, thence to the ground connection, the rod 28, the bullet 30, the barrel of the gun, and thence by the conductor to the other side of the battery 41a. Thus, upon expiration of the time interval selected on the device 41, it functions to trigger or initiate the operation of the oscilloscope 40 for the display of the seismic signals appearing at the detector 35—35a. Zero time for the device 41 always coincides with the instant of application of the acoustic energy to the end of rod 28. Zero time occurs when the bullet 30 contacts the rod 28 to complete the above-traced circuit. Thus, there can be made to appear on the screen 40a of the oscilloscope 40 all, or any selected portion of, the energy received at the strain gauge 35.

There is associated with the oscilloscope 40 photographic means for recording the information visually displayed on the screen 40a of the oscilloscope. The photographic means may comprise a camera preferably of the self-developing type, such as the Polaroid Land camera, or it may comprise a recorder 43 receiving the output from the amplifier 39. The recorder 43 is preferably one constructed like those used for making the field seismograms and including a light source and one or more galvanometer arrangements for directing a light beam on a film or sensitized paper as it is moved at a rate establishing the proper time base for the seismogram.

From the invention as thus far descrmibed, it will be seen that any selected fractional part of a synthetic seismogram will be displayed by the oscilloscope 40 in the absence of reflections corresponding with those from the earth's surface. While the oscilloscope can be arranged to display the entire seismic event on a shortened time base, it will in general be preferred to utilize the recorder 43 for recording the entire seismic event.

Where the effect of reflections from the earth's surface is desired, it is only necessary to shorten the length 28a of the rod 28 in scaled correspondence with the relation of the earth's surface in the velocity log 25 of Fig. 3.

In a preferred embodiment of the invention, a second strain gauge 35a will be provided at the same location lengthwise of the rod 28 as the strain gauge 35. This second strain gauge 35a is preferably connected in parallel with the strain gauge 35. Together they serve the important function of eliminating from the output any effect due to flexure of the rod 28 as a result of the application of the acoustic pulses thereof. Since in terms of the two strain gauges located opposite each other a flexural wave will cause an increase in the output of one, while at the same time causing a decrease in the output of the other, it will be seen that by placing them in parallel and opposite each other on the rod 28, the flexural wave will be cancelled out, while the signals due to the compressional wave will reinforce each other.

A comparison will now be made of the synthetic seismogram produced in accordance with an arrangement like the one just described. The two strain gauges 35 and 35a were located one foot to the left of the beginning of the "earth" section 28c. The field seismogram 45 is shown in time-alignment with the synthetic seismogram 46. The areas of obvious correspondence have been shaded in Fig. 4, and it will be seen that substantially throughout the actual field seismogram 45 there are numerous shaded areas corresponding with those appearing in the synthetic seismogram 46 taken with the rod model which has just been described.

Fig. 5 illustrates the close correspondence between synthetic seismogram 47 and a velocity log 48 utilized to determine the change in cross-sectional area of the rod 28. The correlation, which is self-evident, is quite striking.

Referring again to Fig. 3, though other means responsive to acoustic energy at a region near the earth's surface end of the machined part 28c may be utilized in place of the strain gauges 35 and 35a, the latter have been found quite satisfactory. They are available on the market both in rectangular and square shape and are arranged to be cemented to the surface of the rod. Since they measure the strain developed in the rod as a result of the acoustic waves or the acoustic pressure, it will be desirable to present the applicable equations.

The reflection coefficient in the strain in the rod 28 is equal to that for the acoustic pressure as indicated by the following equation:

$$R_p = \frac{\rho_2 c_2 - \rho_1 c_1}{\rho_2 c_2 + \rho_1 c_1} \quad (1)$$

where $\rho$ is density, and
$c$ is acoustic velocity.

For the machined section 28c, the following equation is applicable:

$$R_s = \frac{A_2 - A_1}{A_2 + A_1} \quad (2)$$

where $A_1$ is area of the leading side of the contrast, and
$A_2$ is area of the far side in reference to the input at generator 29.

Both of the foregoing equations indicate that the reflected strain from a given zone of contrast will be positive when $A_2$ is greater than $A_1$ (and when $\rho_2 c_2$ is greater than $\rho_1 c_1$) and that the reflected strain will be negative when the reverse condition obtains. If the strain gauges were placed at the end of the rod, the reflected signal will cancel the original signal. However, when located as indicated above, the operation has been found to be satisfactory. In accordance with the invention, a strain gauge may be utilized at the end of the rod and the manner in which that is done will now be set forth.

First, reference is made to the equation for the reflection coefficient $R_d$ for displacement. It is as follows:

$$R_d = \frac{A_1 - A_2}{A_1 + A_2} \quad (3)$$

In accordance with Equation 3, it will be seen that at the free end of the rod the reflected displacement will be of the same sign as the original displacement, i. e., the input signal. Consequently a displacement gauge at the end of the rod will respond to additive signals. If one end of a strain gauge be secured to an end of the rod and another end of the strain gauge be fixed to a support adjacent the free end of the rod, any relative movement between that rod and the fixed point will either stretch or compress the strain gauge. Accordingly, such a strain gauge 35c as illustrated in Fig. 1A secured to a fixed support 33 and to the rod 28 produces a signal proportional to the particle displacement of the rod. Strain may be defined in terms of a ratio of partial derivatives of particle displacement to distance along the rod 28, i. e., $$S = \frac{\partial u}{\partial x} \quad (4)$$

where $u$ is the particle displacement, and
$x$ is the distance along the rod.

If the integral of the above expression be taken as strain over a given length of the rod, there will be obtained information as to the magnitude of displacement of the same section of the rod. Thus from Equation 4 it will be seen that the strain gauge may have different locations and may be used in different ways to produce synthetic seismograms.

Where the effects of the presence of a surface layer or boundary are desired in a synthetic seismogram, it is only necessary to shorten the delaying section 28a of the rod 28 so that the reflected energy will modify the reflections appearing at the location of the strain gauges 35 and 35a. This result, introduction of "ghosts," can also be achieved by utilizing the arrangement of the strain gauges at 35c of Fig. 1A and mixing the output thereof with that of the strain gauges 35 and 35a. Since the end of the rod simulates a perfect reflecting surface and thus reflects all waves impinging upon it without substantial reduction in amplitude and without change in phase, it will be desirable in some instances to attenuate the output of the strain gauge 35c before mixing with that of strain gauges 35 and 35a.

From the foregoing explanation of the principles of the present invention, it will be understood that further variations in embodiments may be made within the scope of the appended claims and that in accordance with the principles of the present invention a powerful tool has been provided by means of which better interpretations of field seismograms may be achieved.

What is claimed is:

1. The combination with an elongated elastic member which has a section whose cross-sectional area changes lengthwise thereof in scaled correspondence with velocity changes existing below the earth's surface, of means for applying a pulse of acoustic energy to said elastic member, and detecting means coupled to said elastic member responsive to the effect upon said pulse of acoustic energy of said section.

2. The combination of claim 1 in which said detecting means comprises a strain gauge secured to said elastic member and responsive to changes in strain therein.

3. The combination of claim 1 in which said detecting means comprises two strain gauges located on opposite sides and at the same regions lengthwise of said elastic member and respectively connected in parallel for cancellation of flexural waves of said elastic member.

4. The combination of claim 1 in which said detecting means comprises two strain-responsive devices respectively located on opposite sides and at the same regions lengthwise of said elastic member for simultaneous response to longitudinal strains in said elastic member and for cancelling out flexural strains developed by said elastic member.

5. The combination of claim 1 in which a strain-responsive means is attached at one end to an end portion of said elastic member which is movable in response to said pulse of acoustic energy and the other end of said strain-responsive means is held stationary for producing an output which is additive in respect to said applied pulse and acoustic energy reflected from said end of said elongated member.

6. The combination with an elongated elastic member which has a section whose cross-sectional area changes lengthwise thereof in scaled relation with velocity changes existing below the earth's surface, of means for applying a pulse of acoustic energy to said elastic member in simulation of the application of a burst of acoustic energy to the earth, detecting means coupled to said elastic member responsive to the effect upon said pulse of acoustic energy of said section of changing cross-sectional area for producing an output signal simulating the output signal recorded on a field seismogram, and means for recording said output signal as a function of time.

7. The combination of claim 6 in which said detecting means comprises a strain gauge secured to said elastic member and responsive to changes in strain therein.

8. The combination of claim 6 in which said detecting means comprises two strain gauges located on opposite sides and at the same regions lengthwise of said elastic member and respectively connected in parallel for cancellation of flexural waves of said elastic member.

9. The combination of claim 6 in which said detecting means comprises two strain-responsive devices respectively located on opposite sides and at the same regions lengthwise of said elastic member for simultaneous response to longitudinal strains in said elastic member and for cancelling out flexural strains developed by said elastic member.

10. The combination of claim 6 in which a strain-responsive means is attached at one end to an end portion of said elastic member which is movable in response to said pulse of acoustic energy and the other end of said strain-responsive means is held stationary for producing an output which is additive in respect to said applied pulse and acoustic energy reflected from said end of said elongated member.

11. The combination with an elongated elastic section having an irregular surface with cross-sectional area thereof varying lengthwise of the section in scaled relation with velocity changes existing below the earth's surface to establish corresponding velocity contrasts along said section, of means for applying a pulse of acoustic energy to said elastic section in simulation of the application of acoustic energy to the earth as in seismic surveying, detecting means coupled to said elastic section responsive to the effect upon said pulse of said section for producing an output signal simulating the output signal recorded on a field seismogram, and means for recording said output signal as a function of time.

12. The combination with elongated means having an irregular surface which provides a changing cross-sectional area lengthwise of said elongated means in scaled relation with velocity changes existing below the earth's surface to establish corresponding velocity contrasts, said elongated means responding to applied acoustic energy for reflecting a part of it at each of its regions of changing cross-sectional area and of transmitting a part of it lengthwise thereof, of means for applying a pulse of acoustic energy to said elongated means in simulation of the application of acoustic energy to the earth as in seismic surveying, detecting means coupled to said elongated means responsive to the effect upon said pulse of said changing cross-sectional areas for producing an output signal simulating the output signal recorded on a field seismogram, and means for recording said output signal.

13. A system of producing a record representative of sound waves reflected from subsurface velocity interfaces free from the effect of the existence of an overlying earth-air boundary which comprises an elongated elastic member which beginning at an intermediate point thereof has an intermediate section of cross-sectional area which changes lengthwise thereof in scaled relation with the velocity changes existing below the earth's surface and is of uniform cross-sectional area on both sides of said intermediate section, means for applying a pulse of acoustic energy to the end of said elastic member of uniform cross-sectional area to produce upon the arrival of said pulse a simulation of the application of a burst of energy to the earth, detecting means coupled to said elastic member adjacent said intermediate section responsive to the effect upon said pulse of said section of changing cross-sectional area for producing an output signal simulating the output signal recorded on a field seismogram, and means for recording said output signal.

14. The system of claim 13 in which means are provided for discontinuing said recording of said output signal after a time interval shorter than the travel time of reflections from the ends of said elastic member to said intermediate section.

15. A system of producing a record simulating sound waves reflected from subsurface velocity interfaces free from the effect of the existence of an earth-air boundary which comprises an elongated elastic member which has an intermediate section of cross-sectional area which changes lengthwise of said member in scaled relation with the velocity changes existing below the earth's surface and is of uniform cross-sectional area on both sides of said intermediate section, means for applying a pulse of acoustic energy to an end of said elastic member to produce upon the arrival of said pulse at said intermediate section a simulation of the application of a burst of energy to the earth, detecting means coupled to said elastic member adjacent said intermediate section responsive to said pulse to produce a time-break signal and responsive to the effect upon said pulse of said section of changing cross-sectional area for producing an output signal simulating the output signal recorded on a field seismogram, and means for recording said time-break signal and said output signal as a function of time following said time-break signal.

16. The system of claim 15 in which said recording means has a time controller for recording of said output signal during a time interval shorter than the travel time of reflections from the ends of said elastic member to said intermediate section to produce a simulated seismogram free of ghosts.

References Cited in the file of this patent

UNITED STATES PATENTS 2,697,936      Farrow _____ Dec. 28, 1954